Figure 1:
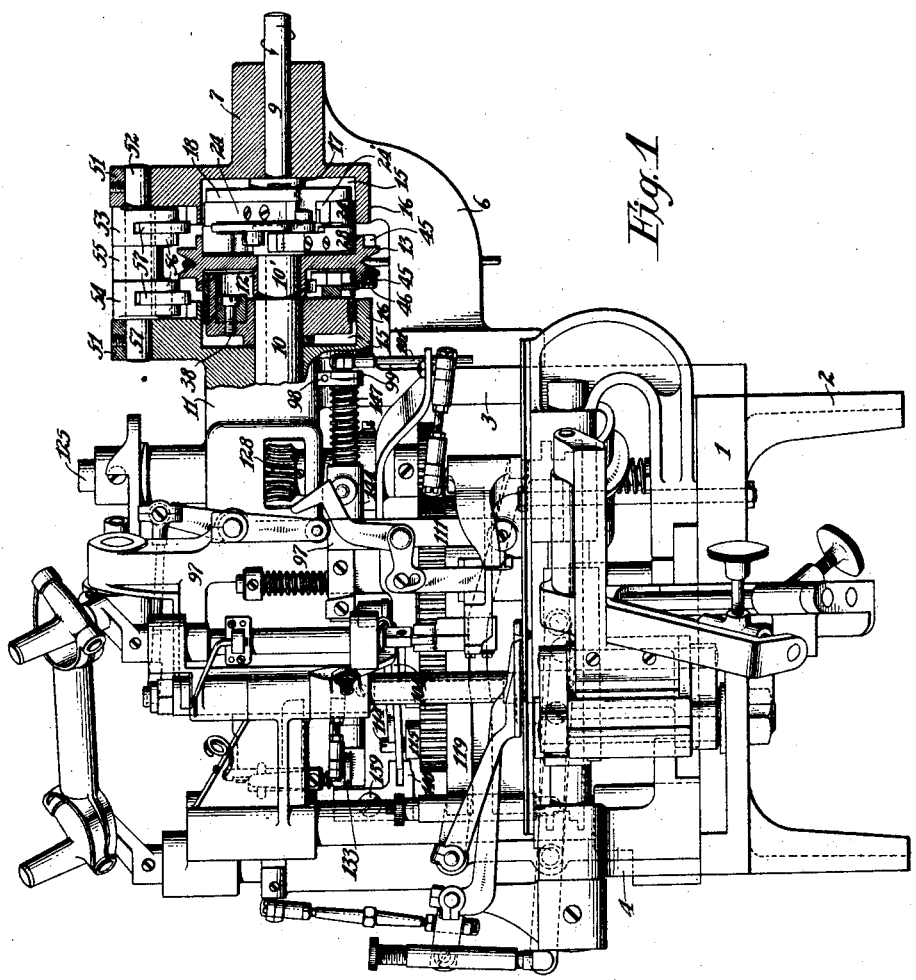

A. H. DE VOE.
CLUTCH MECHANISM.
APPLICATION FILED MAR. 11, 1918. RENEWED JAN. 7, 1921.

1,388,412.

Patented Aug. 23, 1921.
6 SHEETS—SHEET 1.

WITNESSES

INVENTOR
Albert H. DeVoe
BY
Henry J. Miller
ATTORNEY

A. H. DE VOE.
CLUTCH MECHANISM.
APPLICATION FILED MAR. 11, 1918. RENEWED JAN. 7, 1921.

1,388,412.

Patented Aug. 23, 1921.
6 SHEETS—SHEET 2.

WITNESSES
Adrian De Man.
John F. Heine

INVENTOR
Albert H. DeVoe
BY Henry J. Miller
ATTORNEY

A. H. DE VOE.
CLUTCH MECHANISM.
APPLICATION FILED MAR. 11, 1918. RENEWED JAN. 7, 1921.
1,388,412.
Patented Aug. 23, 1921.
6 SHEETS—SHEET 3.
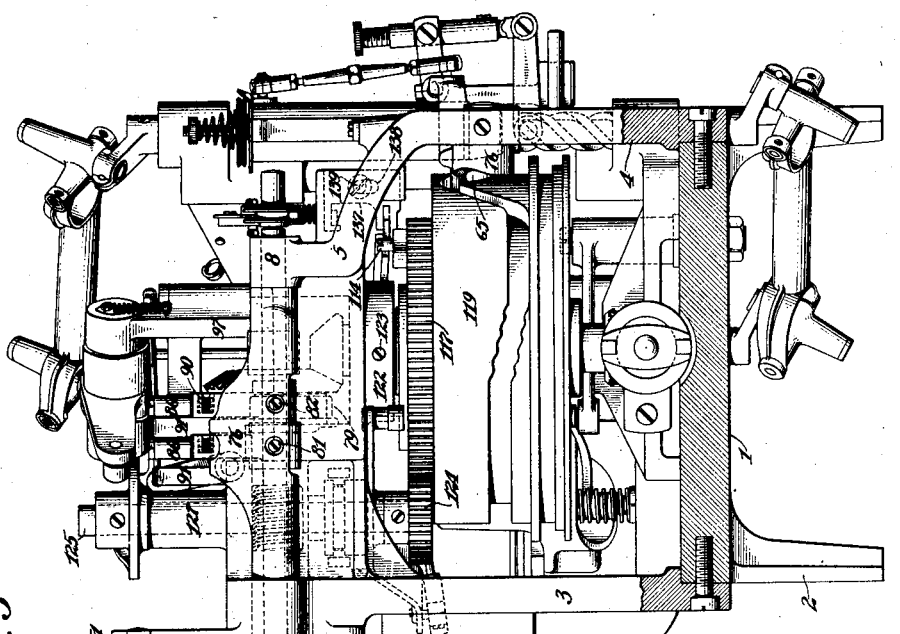
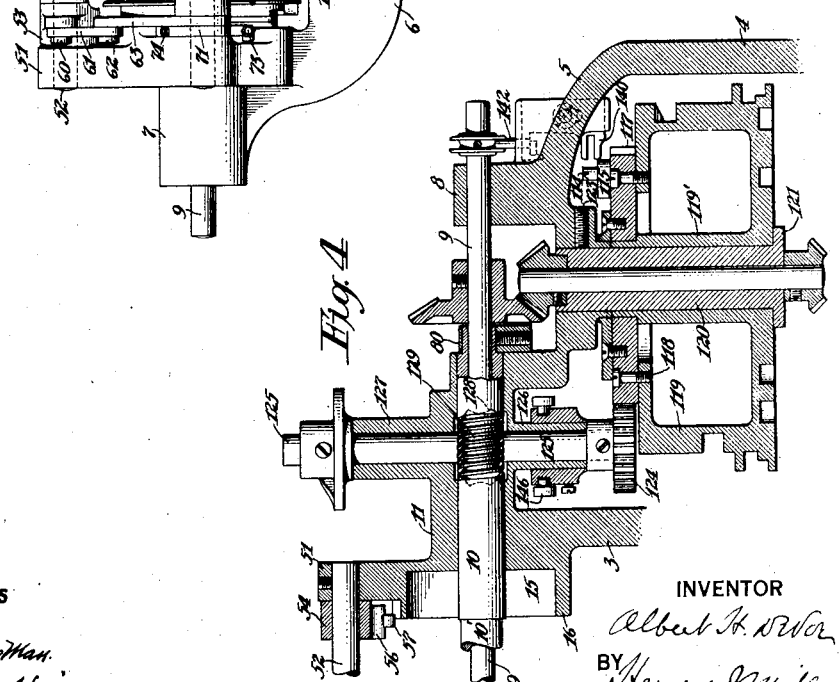

A. H. DE VOE.
CLUTCH MECHANISM.
APPLICATION FILED MAR. 11, 1918. RENEWED JAN. 7, 1921.

1,388,412.

Patented Aug. 23, 1921.

6 SHEETS—SHEET 4.

WITNESSES

INVENTOR

A. H. DE VOE.
CLUTCH MECHANISM.
APPLICATION FILED MAR. 11, 1918. RENEWED JAN. 7, 1921.
Patented Aug. 23, 1921.
6 SHEETS—SHEET 5.
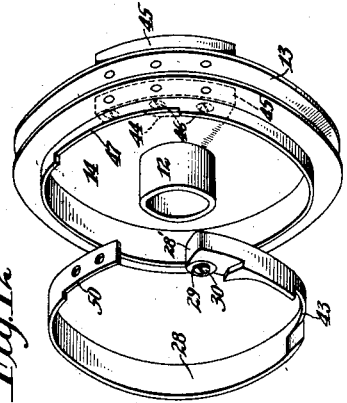
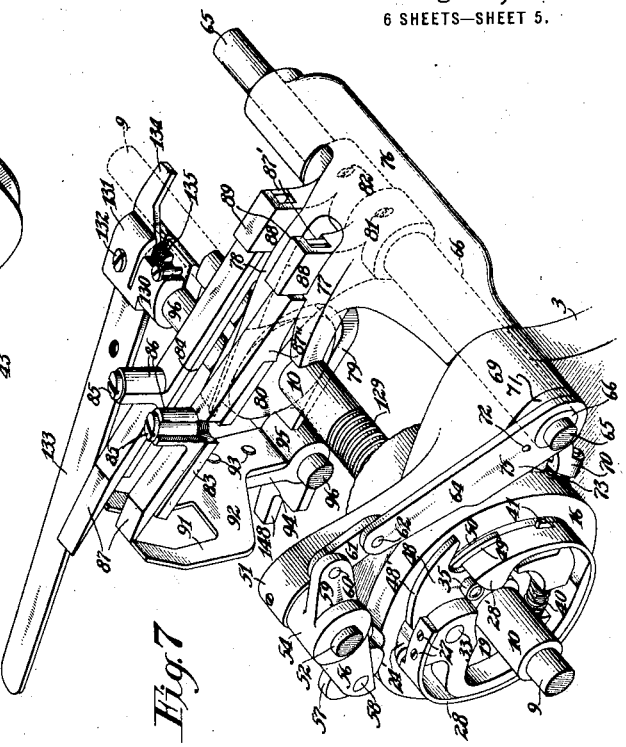
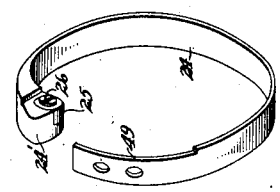
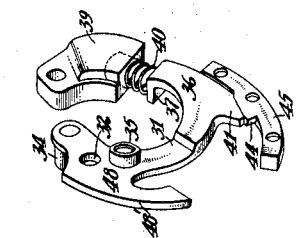
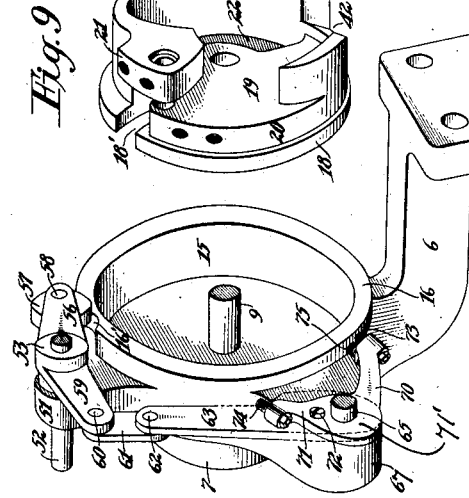
INVENTOR
Albert H. DeVoe
BY
Henry J. Miller
ATTORNEY A. H. DE VOE.
CLUTCH MECHANISM.
APPLICATION FILED MAR. 11, 1918. RENEWED JAN. 7, 1921.

1,388,412.

Patented Aug. 23, 1921.
6 SHEETS—SHEET 6.

WITNESSES
Adrian DeMan.
John F. Heine

INVENTOR
Albert H. DeVoe
BY
Henry Miller
ATTORNEY

UNITED STATES PATENT OFFICE.

ALBERT H. DE VOE, OF WESTFIELD, NEW JERSEY, ASSIGNOR TO THE SINGER MANUFACTURING COMPANY, A CORPORATION OF NEW JERSEY.

CLUTCH MECHANISM.

1,388,412.   Specification of Letters Patent.   Patented Aug. 23, 1921.

Original application filed December 31, 1915, Serial No. 69,644. Divided and this application filed March 11, 1918, Serial No. 221,595. Renewed January 7, 1921. Serial No. 435,762.

*To all whom it may concern:*

Be it known that I, ALBERT H. DE VOE, a citizen of the United States, residing at Westfield, in the county of Union and State of New Jersey, have invented certain new and useful Improvements in Clutch Mechanisms, of which the following is a specification, reference being had therein to the accompanying drawings.

This invention relates to clutch devices and more particularly to starting and stopping devices for power driven machines having a plurality of trains of mechanism the operation of which it is desired to effect in a certain required order.

An object of the invention is to provide an improved clutch device which will operate quietly, smoothly and without shock to couple a driven shaft to a driving shaft and, if desired, to effect such coupling of the shafts in predetermined angular or circular relationship.

A further object of the invention is to provide a clutch device for coupling a plurality of trains of mechanism of a machine to a main driving shaft in a certain order and to provide for the stopping of one or more of such trains of mechanism in suitable order in an emergency occasioned by faulty action of one or more parts of the machine.

In the preferred embodiment of the invention, the control of the entire mechanism is centralized in a member of the starting device by which, not only are the starting and stopping of the several operative portions of the machine effected in the required order, but one or more of such portions of the machine may be stopped in suitable order in emergency.

The clutch device proper, consists of a driving element preferably in the form of a belt-wheel having clutch cavities in its opposite faces. Opposed to the clutch cavities of the driving element are corresponding brake cavities formed in the machine frame and constituting, together with the clutch cavities, housings substantially entirely inclosing transmission disks fixed to their respective driven shafts and formed with clutch-bands and suitable clutch-levers for alternately effecting expansion of such bands into engagement with the peripheral walls of the clutch and brake cavities.

The operation of the clutch levers is effected by means of suitable clutch controlling mechanism which may be started manually and which normally operates automatically to carry the parts through a desired cycle of operations and effect stoppage of the driven members. The clutch controlling mechanism is, however, under the control of the operator, whereby premature stoppage of the driven elements may be effected in case of emergency.

Figure 17:
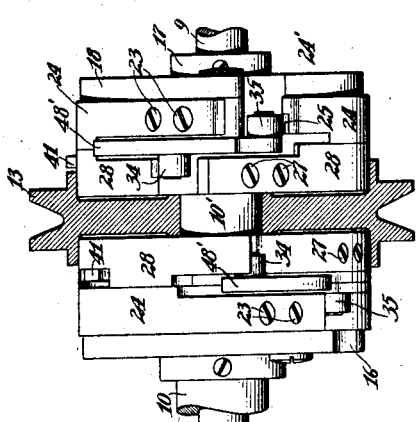
Figure 2:
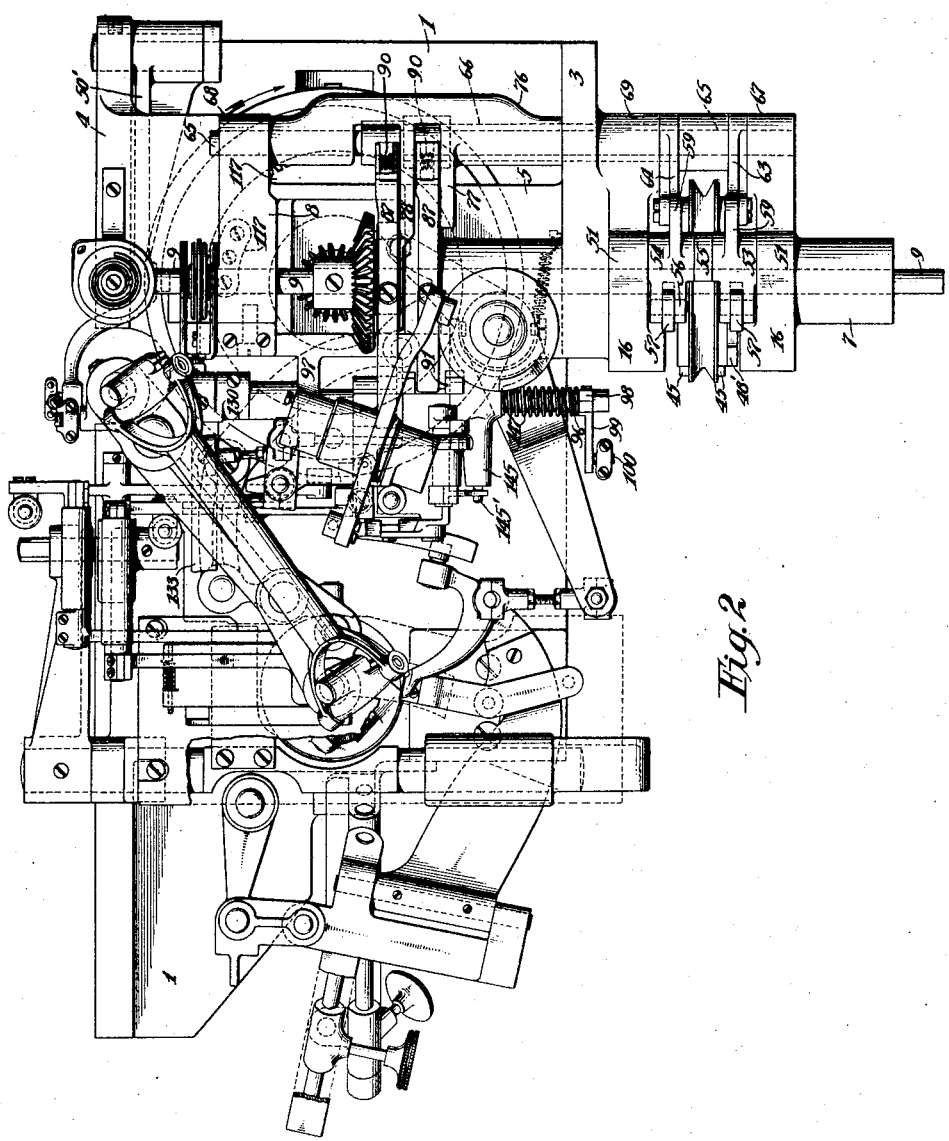
Figure 6:
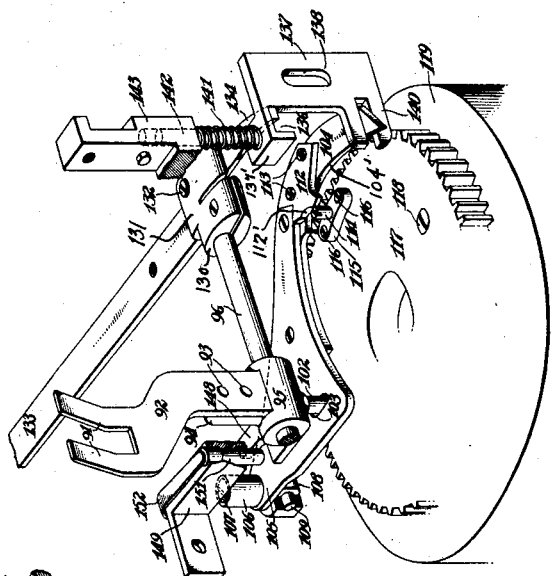
Figure 5:
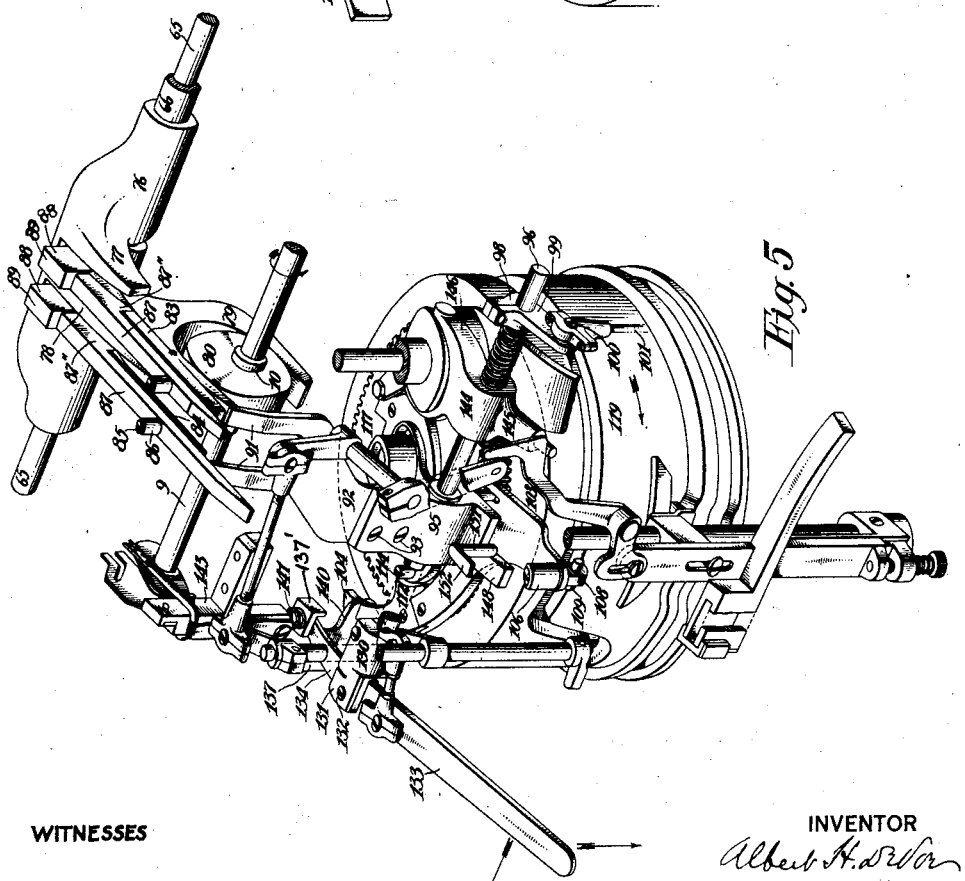
Figure 18:
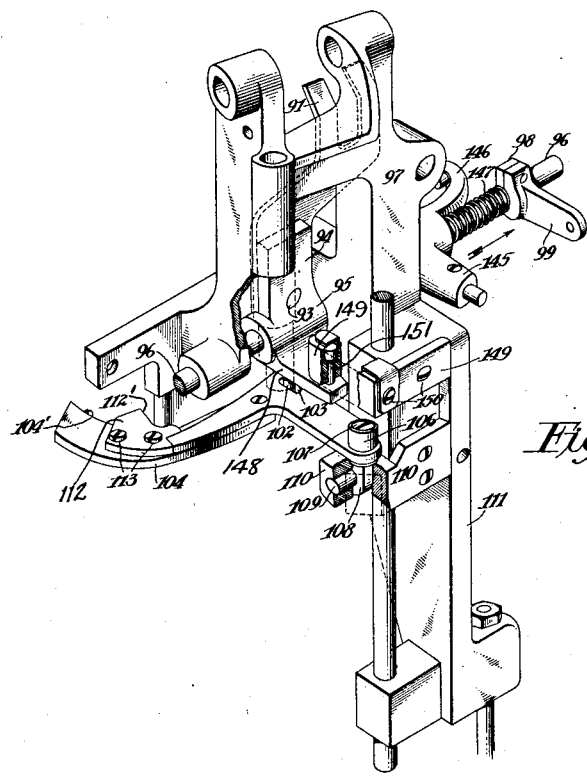
Figure 15:
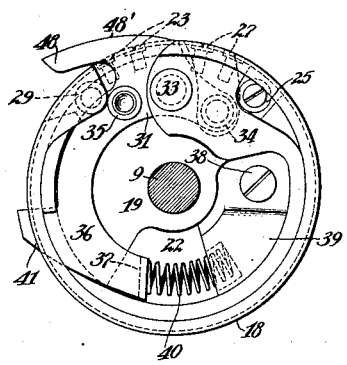
Figure 16:
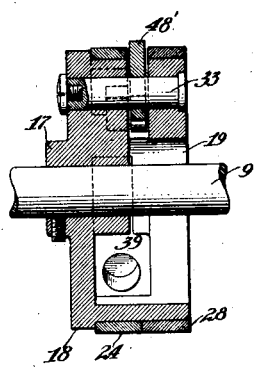

In the accompanying drawings, Figure 1 is a front view of a buttonhole sewing machine embodying the present clutch mechanism. Fig. 2 is a top plan view and Fig. 3 is a rear elevation of the machine. Fig. 4 is a sectional elevation representing parts of the automatic controlling devices for the clutch mechanism. Figs. 5 and 6 are perspective views bringing out the construction of the clutch controlling devices. Fig. 7 is a perspective view representing the clutch mechanism and its controlling devices, whereby the operative parts of the machine are connected with the source of power. Figs. 8, 9, 10, 11, 12, 13 and 14 are perspective views of detached parts of the clutch mechanism. Figs. 15 and 16 are, respectively, a side elevation and a transverse sectional view of the operative parts of one of the clutches, and Fig. 17 is an elevation of the clutch mechanism with the driving wheel in section, showing the relation of the operative parts of the two clutches through which power is transmitted from the driving wheel for actuation of the several groups of mechanism of the machine. Fig. 18 is a perspective detail view of portions of the clutch control mechanism.

The present invention is disclosed as embodied in a buttonhole sewing machine of the type represented in my copending application Serial No. 69,644, filed December 31, 1915, of which this application is a division.

As illustrated in the drawings the machine frame is constructed with the bedplate 1 having the depending legs 2 and the standards 3 and 4 at opposite edges connected by the cross-member 5. The standard 3 is shown provided with a laterally extending bracket 6 formed with a bearing boss 7 in which and a bearing boss 8 is journaled the rotary shaft 9 which drives the stitch-forming mechanism and which is surrounded by a tubular shaft 10 for driving the feeding and buttonhole cutting mechanisms, which shaft is journaled in a bearing boss 11 of the cross-member 5.

Loosely mounted upon the reduced outer end portion 10' of the shaft 10 is the hub 12 of the peripherally grooved belt-wheel 13 formed in its opposite faces with annular clutch-cavities 14 each opposed to a similar brake cavity 15 of one of the hollow bosses 16 of the bearing bracket 6 and frame boss 11, respectively (Figs. 1 and 8.)

The shafts 9 and 10 carry adjacent and upon opposite sides of the driving pulley 13 suitable clutching and braking devices which are similar in construction, except in being in right-and-left arrangement, and therefore a description of the one will apply equally to the other.

The shaft 9 is shown having fixed thereon within the brake-cavity 15 of the bracket 6 the hub 17 of a disk 18 formed upon its inner face with a boss 19 affording peripheral brake-band and clutch-band seats 20 and 21 and cut out at one side to form a segmental recess 22.

The seat 20 has secured thereon by screws 23 one end, suitably apertured, of the brake-band 24, having an enlarged opposite extremity 24' recessed to receive the anti-friction roller 25 mounted upon the bearing stud 26 tapped into the part 24', which lies normally within and in braking relation with the inner wall of the surrounding brake-band cavity 15. The seat 21 has secured thereon by screws 27 one apertured extremity of the similarly formed clutch-band 28 having its opposite end 28' recessed in its inner face to receive the anti-friction roller 29 journaled upon the bearing stud 30 tapped into said end of the clutch-band, this clutch-band being normally embraced by but maintained out of contact with the walls of the adjacent clutch-cavity 14 of the belt-wheel 13.

The boss 19 of the disk 18 is cut away upon the side opposite the recess 22 to receive the angular clutch-lever 31 having an aperture 32 to receive a fulcrum-stud 33, by means of which it is pivotally mounted within a slot of said boss between the seats 20 and 21. The lever 31 carries upon opposite faces and at opposite sides of the fulcrum-aperture 32 the laterally projecting roller-studs 34 and 35, the former working in the radial slot 18' of the disk 18 and being adapted to contact with the roller 25 of the brake-band and the latter to engage the roller 29 of the clutch-band.

That arm of the clutch-lever 31 carrying the roller-stud 35 has a substantially segmental extension 36 formed at its extremity with an inwardly extending lug 37 entering the cavity 22 of the disk 18 in which latter is secured by means of a screw 38 a thrust-block 39. Between the bottom of a cavity in the thrust-block 39 and the lug 37 is interposed a spring 40 which acts upon the clutch-lever to force the stud 35 into engagement with the clutch-band roller 29 and to retract the stud 34 from contact with the brake-band roller 25.

The clutch-lever extension 36 is formed with an outwardly projecting portion 41 passing through the clearance notch 42 of the clutch-band seat 21 and the notch 43 of the clutch-band 28 and affording an inclined bearing shoulder for engagement with the similarly inclined edge of an inwardly extending lug 44 of one of the segmental thrust-blocks 45 secured by means of screws 46 upon opposite sides of the rim of the driving pulley 13. When the clutch-lever 31 is free to turn upon its fulcrum-stud 33 under the action of the spring 40, the projection 41 rests upon the inner wall of the clutch-cavity 14 of the driving wheel until it comes into register with the clearance notch 47 therein (Fig. 15), through which it emerges to permit a clutching action of the lever 31 which is thus caused to thrust the stud 35 into engagement with the roller 29 to expand the clutch-band 28 into gripping relation with the wall of the clutch-cavity. The initial slip of the clutch-band upon the driving wheel is arrested by the engagement of the projection 41 with the lug 44 extending into the notch 47, whereby, not only is the clutch-lever thrust still more forcibly into clutching relation, but a positive coupling is insured between the driving and driven members.

The clutch-lever arm sustaining the roller-stud 35 has a second outwardly projecting portion 48 which extends through notches 49 and 50 in the adjacent edges of the brake and clutch-bands 24 and 28 and between the adjacent edges of the rims of the bosses 16 and the driving wheel 13 beyond which latter it presents an eccentrically arranged segmental bearing surface 48' to provide for actuation of the clutch-lever from the exterior of the clutch device.

The bosses 16 containing the brake-band cavities are provided each with an upwardly extending lug 51 in which is mounted the rock-shaft 52 having journaled thereon for independent movement the hubs 53 and 54 of two rock-levers spaced apart by means of the intermediate collar 55. These rock-levers each comprise a tappet-arm 56 forked at its outer extremity to embrace a roller 57 sustained therein upon the journal-pin 58. The rollers 57 are disposed each above one of the spaces between the driving wheel and one of the bosses 16, (Fig. 1) and therefore above the paths of movement of the clutch-lever extensions 48 into and out of engagement with which they are designed for movement. These rock-levers are provided with oppositely extending arms 59 each pivotally connected by means of a pin 60 with one end of a link 61 having its opposite end connected by a pin 62 with one of the levers 63 and 64, the former being fixed upon an inner rock-shaft 65 and the latter upon a tubular rock-shaft 66 surrounding the same.

The inner rock-shaft 65 is journaled at its opposite ends within a bearing 67 extending from the outer brake-band boss 16 and a bearing 68 of the frame cross-member 5 (Fig. 2), and the tubular rock-shaft 66 is journaled internally upon the rock-shaft 65 and externally within a bearing 69 extending laterally from the inner brake-band boss 16 and the frame standard 3. The links 61 and arms 64 form between the rock-levers 54, 56 and 59 and their respective rock-shafts toggle devices of which the extreme operative positions are determined by the angularly arranged stop-arms 70 and 71 (Figs. 7 and 8) each secured to and movable with its respective toggle arm by means of a screw 72. Each of the arms 70 and 71 carries a stop-screw 73 and 74, respectively, adapted to contact with the exterior of the boss 16 for determining the throw of the link 64.

When either toggle is bent under the action of the spring 75 interposed between the stop-arm 70 and the adjacent boss 16, the roller 57 is retracted, and its respective clutch-lever is permitted to revolve with the driving wheel unobstructedly; but when the toggle is straightened as represented particularly in Figs. 7 and 8, the roller 57 is moved inwardly into the peripheral clearance notch 16' of the boss 16, and into the path of movement of the extension 48 of its respective clutch-lever, thereby thrusting the same inwardly to shift the clutch-lever for uncoupling its respective shaft from the driving wheel and applying the brake in the manner before described.

As the outer end portion of the bearing face 48' of the clutch-lever extension 48 extends slightly beyond the roller 57 even when the roller-stud 34 engages the brake-band roller 25 (Fig. 14) it is evident that the roller 57 imposes a positive barrier to the continued rotation of the clutch-lever with its connected shaft, and therefore positively brings the latter to rest always in the same position, so that the positions of rest of the moving parts are invariably the same. It is also evident that, although the shafts 9 and 10 are adapted to be coupled independently to the common driving wheel 13, the clutching devices act, as previously described, to couple them to the driving member in such manner that they invariably assume a predetermined circular relation during a working cycle, which is a matter of importance in buttonhole sewing machines involving the action of different work-engaging elements upon the fabric in succession in substantially the same working position.

Loosely journaled at one end upon the tubular rock-shaft 66 and at the other end upon the concentric inner shaft 65 is a rocking sleeve 76 provided intermediate its ends with the spaced laterally projecting tappet-arms 77 and 78, the arm 78 having an extension formed with a yoke 79 which embraces an actuating cam or eccentric 80 fixed upon and rotating with the tubular shaft 10. The sleeve 76 is cut away on one side intermediate its ends to expose the inner end of the tubular rock-shaft 66 and the adjacent portion of the rock-shaft 65, which have secured thereon by means of set-screws 81 and 82 the hubs of two laterally extending arms 83 and 84 each disposed adjacent one of the tappet-arms 77 and 78.

Each of the arms 83 and 84 has tapped into its upper face a shouldered stud-screw 85 entering the apertured boss 86 of a laterally movable latch-lever 87. Each lever 87 has its end portion adjacent the sleeve 76 notched in one side and the reduced portion 87' thus formed extended within a housing afforded by a lug 88 and overhanging lip 89 formed upon the adjacent tappet-arm, a spring 90 being interposed between the parts 87' and 88 to normally maintain the latch-lever in superposed relation and alinement with its supporting arm, and with a depending stop-flange 87" thereof in contact relation with the edge of said supporting arm which is notched to receive the same.

Under the action of their respective springs 90, the latch-levers are normally maintained out of the range of action of the adjacent tappet-arms 77 and 78, and the arms 83 and 84 may assume their lower positions in which the toggle 61 and 64 are bent; but when the latch-levers 87 are shifted laterally in opposition to such springs, as represented at the left in Fig. 7, they are caused to project above the respective tappet-arms, which perform constant rising and falling movements during the operation of the machine, and are thereby lifted so as to straighten said toggles and tilt the rock-levers 56, 59 into stopping position.

The ends of the latch-levers 87 opposite their notched extremities project in different degrees beyond the corresponding ends of the arms 83 and 84, the one sustained by the arm 83 being the shorter of the two. In the elevated positions of the said arms assumed while the machine is at rest, the overhanging portions of the levers 87 rest upon the ends of the spaced members of a yoke 91 at the upper end of a detaining arm 92 secured by screws 93 upon a plate 94 extending upwardly from a collar 95 fixed upon the endwise movable starting rock-shaft 96 in the bearing bracket 97 secured to the front side of the frame cross-member 5.

The rock-shaft 96 is shown having secured upon one end the split hub 98 of a lateral crank-arm 99 carrying a crank-pin 100 embraced by a strap at the upper end of a treadle-rod 101, by which the rock-shaft may be rocked in starting the machine to retract the detaining yoke 91 for disengagement of one of its members with the shorter of the latch-levers 87 to permit its carrying arm 83 to descend for bending the inner toggle to effect the coupling of the tubular shaft 10 with the driving pulley. A subsequent endwise movement of the shaft 96 causes the edgewise shifting of the detaining yoke and consequent disengagement of the other member thereof from the longer latch-lever 87 to effect the coupling of the shaft 9 with the driving pulley.

The collar 95 carries a depending pin 102 which enters an elongated aperture 103 in a substantially segmental cam-lever 104 having at one end a lateral extension 105 formed with an apertured boss 106 entered by the fulcrum stud-screw 107 which is tapped into the depending block 108 carrying the transverse fulcrum-pin 109 (Figs. 6 and 18) which is journaled in a suitably apertured bracket-piece 110 secured to the standard 111 which depends from the bearing bracket 97. The angularly arranged fulcrum-pins 107 and 109 form a universal-joint connection of the cam-lever 104 with its supporting frame whereby such lever is adapted for movement both horizontally and vertically.

The concave edge 104' of the cam-lever and the overhanging angular edge 112' of the cam-plate 112 secured by screws 113 thereon are adapted for engagement by a stud 114 upon a block 115 secured by screws 116 upon the upper face of a gear-wheel 117 which is in turn secured by screws 118 upon the upper face of the feed cam-cylinder 119. The cam-cylinder 119, Fig. 4, is formed with a hub 119' fitted upon a tubular bushing 120 having at its lower end the flange 121 to support the weight of the cam and secured within a hub 122 of the frame cross-member 5 by means of set-screws 123, of which only one is shown.

Meshing with the gear-wheel 117 is a driving pinion 124 secured upon the lower end of the cutter-actuating shaft 125 journaled in the bearing bosses 126 and 127 having fixed thereon the worm-wheel 128 meshing with the worm 129 formed in the tubular shaft 10. By the means described the shaft 10, which rotates in unison with the driving pulley 13, turns the cutter-shaft 125 at a reduced speed through the described worm and worm-wheel connection and the feed-cam is driven at a still slower speed by its speed-reducing gear connection with the cutter-shaft.

The starting rock-shaft 96 has secured upon its end opposite the crank-arm 99 the split hub 130 of a block 131 having a transverse slot in which is secured by means of the pivotal screw-pin 132 the forwardly extending starting lever 133 having a rearward extension 134 of reduced width. The hub 130 is formed with a socket between the bottom of which and the adjacent edge of the lever 133 is interposed a spring 135 (Fig. 7) by which the edge of the lever is yieldingly maintained in contact with the inner end of the embracing slot of the block 131 (Fig. 5).

The extension 134 of the starting lever enters and engages the upper wall of a recess 136 of a lifting slide-plate 137 formed with a slot 138 to receive a screw 139 by which it is slidingly sustained upon an upright seat upon the frame-member 5. The plate 137 is formed with a forked lateral extension 140 embracing the free end portion of the cam-plate 104 (Fig. 6). The lifting plate is normally pressed downwardly by means of a spring 141 surrounding a pin 142 entering a socket in a frame-member 143 between which and the lifting plate the spring is interposed.

The rock-shaft 96 has loosely mounted thereon the hub 144 of a rock-lever having a lateral arm 145 and an oppositely extending arm formed with a yoke 146. The hub of this lever rests against the adjacent member of the bearing bracket 97, and has interposed between it and the hub 98 of the crank-arm 99 a spring 147 by means of which the rock-shaft 96 is pressed endwise in the direction indicated by the arrow in Fig. 18, and through the pin-and-slot connection 102 103 the cam-lever 104 is yieldingly maintained within the range of movement of the stud-pin 114 moving with the cam-wheel 119.

The collar 95 is formed with a laterally notched and forwardly projecting finger 148 which, under the normal action of the spring 141 upon the extension 134 of the starting lever, is normally pressed upwardly in contact with the bottom of the angle-piece 149 secured upon the standard 111 by screws 150, (Figs. 6 and 18). The operative end of this angle-piece is formed with a socket containing the headed plunger-pin 151 with its lower end normally projecting below the bottom of the angle-piece under the action of the flat spring 152 overlying the angle-piece and pressing upon the head of the plunger-pin.

When the starting rock-shaft 96 is in initial position in which the yoke 91 detains the clutch-controlling levers 83 and 84 in elevated position, the finger 148 occupies the position beneath the angle-piece 149 represented in Fig. 18, the lower end of the plunger-pin 151 resting upon such finger. When, however, the rock-shaft 96 performs its two-step endwise operative movement under the action of the stud-pin 114 successively upon the cam edges 104' and 112', the finger 148 is moved edgewise in a direction opposite to that indicated by the arrow in Fig. 18, and the plunger-pin 151 descends under the action of its spring 152 into latching relation with the finger, as indicated in Fig. 5.

The finger 148 remains in engagement with the detaining plunger-pin 151 until the shaft 96 is rocked by means of the treadle-rod 101 or the finger-lever 133 at the beginning of a succeeding working cycle, when the finger 148 becomes disengaged from the plunger-pin 151 and is permitted under the action of the spring 147 to reassume its initial position beneath the same.

The rocking of the starting shaft 96 by depression of the crank-arm 99 or finger-lever 133 not only causes the disengagement of the yoke 91 from one of the latch-levers 87 to effect the starting of the tubular shaft 10 which drives the cam-wheel 119, but acts through the extension 134 of the lever 133 to raise the lifting plate 137 in opposition to its spring 141, thereby lifting the cam-plate 112 out of engagement with the stud-pin 114 with which it remains in engagement at the completion of a working cycle, thereby permitting the starting shaft 96 to perform one step of its operative movement under the action of the spring 147 and bring the operative edge of the cam-lever 104 into engagement with the stud-pin 114.

In this position of the shaft 96, the second of the yoke-members 91 is still beneath the longer of the latch-levers 87, but as the stud-pin 114 performs its travel with the supporting cam-wheel, it rides off the end of the cam-lever 104 and thereby further removes the restraint upon the shaft 96 against the second stage of its endwise clutch controlling movement under the action of the spring 147. In performing the second stage of its movement, the shaft 96 carries the yoke 91 from beneath the latch-lever 87, thereby permitting the arm 84 to descend and thus effect the coupling of the shaft 9 with the driving pulley to set the stitch-forming mechanism in operation.

The starting lever extension 134 normally rests against the body of the lifting plate 137, as indicated in Fig. 6, not only when the parts are in stopping position but after the initial actuation of the starting rock-shaft 96. The second stage of endwise movement of the shaft 96 carries the lever 133 bodily with it to bring the extension 134 into contact relation with the depending lip 137' affording the opposite wall of the recess 136 where it remains during the stitching operation.

In order to stop one or both trains of mechanism actuated by the shafts 9 and 10 during a working cycle of the machine, the starting lever 133 may be manually shifted edgewise in the direction of the arrow (Fig. 5) to move the rock-shaft 96 toward initial position in opposition to its spring 147. This movement of the shaft acts, similarly to the corresponding movement automatically effected by means of the stud-pin 114 and the cam-lever 104, to bring the edge of the appropriate member of the yoke 91 against the adjacent edge of the longer latch-lever 87 to laterally shift the same into engagement with the tappet-arm 78 for lifting the arm 84 to uncouple the shaft 9 from the driving pulley, the raising of the latch-lever 87 with its supporting arm permitting it when in its highest position to snap into initial position above its actuating yoke-member under the action of the spring 90.

A continued movement of the starting lever 133 in the same direction produces a like engagement of the other detaining yoke-member 91 with the shorter latch-lever 87 for uncoupling the shaft 10 from the driving pulley. It is evident that the elements 87 and 91 are spaced apart sufficiently and are of the requisite width to permit the described successive control of the clutch - controlling arms 83 and 84.

It is to be understood that while the invention is described as embodied in a buttonhole sewing machine it is of general utility and is susceptible of embodiment in widely different forms without departing from or sacrificing the advantages of the invention.

Having thus set forth the nature of the invention, what I claim herein is—

1. In a clutch device, in combination, a driving member and a braking member having adjacent portions formed with annular friction faces, a driven member formed with seats opposed respectively to said friction faces, friction contact elements movable relatively to each other and secured to said seats and adapted to effect frictional engagement with the friction faces of the driving and braking members, and means acting reciprocally upon said elements for effecting their alternate engagement with the respective friction faces.

2. In a clutch device, in combination, a driving member and a braking member having adjacent portions formed with annular friction faces, a driven member formed with annular seats constantly maintained at fixed distances from and opposed respectively to said friction faces, friction bands secured to said seats and adapted respectively for engagement with said friction faces, and means acting reciprocally upon said bands for effecting their alternate engagement with the respective friction faces.

3. In a clutch device, in combination, a driving member and a braking member having adjacent portions formed with cavities affording annular friction walls, a driven member formed externally with annular seats opposed respectively to said friction walls, friction bands secured to said seats and adapted respectively to effect by expansion engagement with said friction walls, and means adapted to act upon either of said bands for effecting its engagement with its respective friction wall.

4. In a clutch device, in combination, a driving member and a braking member having adjacent portions formed with annular friction faces, a driven member formed with seats opposed respectively to said friction faces, friction contact elements sustained by said seats and adapted respectively for engagement with said friction faces, and a clutch-lever fulcrumed upon said driven member and adapted to effect the alternate engagement of said contact elements with their respective friction faces.

5. In a clutch device, in combination, driving and braking members having adjacent portions formed with circular friction faces, a driven member formed with seats opposed respectively to said friction faces, friction contact elements sustained by said seats and adapted respectively for engagement with said friction faces, a clutch-lever fulcrumed upon said driven member and adapted to effect the alternate engagement of said contact elements with their respective friction faces, and a spring interposed between said driven member and the clutch-lever and acting through the latter to normally maintain one of said contact elements in engagement with its respective friction face while the other is maintained in retracted position upon the driven member.

6. In a clutch device, in combination, driving and braking members having adjacent portions formed with circular friction faces, a driven member formed with seats opposed respectively to said friction faces, friction contact elements sustained by said seats and adapted respectively for engagement with said friction faces, a clutch-lever fulcrumed upon said driven member and adapted to effect the alternate engagement of said contact elements with their respective friction faces, a spring interposed between said driven member and the clutch-lever and acting through the latter to normally maintain one of said contact elements in engagement with its respective friction face while the other is maintained in retracted position upon the driven member, and a controlling element movable into and out of the path of said lever for shifting the same to reverse its action upon said contact elements.

7. In a clutch device, in combination, driving and braking members having adjacent portions formed with circular friction faces, a driven member formed with seats opposed respectively to said friction faces, friction contact elements sustained by said seats and adapted respectively for engagement with said friction faces, a spring-pressed clutch-lever fulcrumed upon said driven member and adapted to effect the normal engagement of one of said contact elements with the friction face of said driving member while the other of said contact elements is disengaged from its respective friction face upon the braking element and provided with a thrust-receiving shoulder, and a tappet-arm mounted upon a fixed fulcrum and provided with means for shifting it into and out of the path of movement of said shoulder for reversing the action of said clutch-lever upon the contact elements.

8. In a clutch device, in combination, a driving member and a braking member having adjacent portions formed with annular friction faces, a driven member formed with seats opposed respectively to said friction faces, friction contact elements sustained by said seats and adapted respectively for engagement with said friction faces, and a clutch-lever fulcrumed upon said driven member and adapted to effect the alternate engagement of said contact elements with their respective friction faces, coacting means being provided between said driving member and the clutch-lever whereby the latter is rendered effective in coupling the driven with the driving member only in a predetermined circular relation of said members.

9. In a clutch device, in combination, a driving member, a plurality of braking members, a plurality of driven members, and means for effecting independently the coupling of said driven members with said driving member in predetermined circular relation and for operatively connecting said driven members with said braking members also in predetermined circular relation.

10. In a clutch device, in combination, a plurality of braking members formed with friction faces, a driving member also formed with friction faces, a plurality of driven members, a plurality of friction contact elements carried by each of said driven members and adapted to contact respectively with one of the friction faces of the driving member and the friction face of one of the braking members, means acting correspondingly but independently to effect engagement of the contact faces of the driving element by their respective contact elements, and means acting correspondingly but independently to effect engagement of the friction faces of the braking members by their respective contact elements.

11. In a clutch device, in combination, a driving member having at opposite sides annular friction faces, braking members disposed upon opposite sides thereof and having portions adjacent the driving member formed also with annular friction faces, driven members upon opposite sides of the driving member and each formed with annular seats opposed respectively to the adjacent friction faces of the driving and braking members adjacent the same, friction bands secured to the seats of each driven member and adapted for engagement each with its respective friction face, and mutually independent means acting reciprocally upon the bands of each driven member for effecting their alternate engagement with the respective friction faces.

12. In a clutch device, in combination, a driving member having at opposite sides annular friction faces, braking members disposed upon opposite sides thereof and having portions adjacent the driving member formed also with annular friction faces, driven members upon opposite sides of the driving member and each formed with annular seats opposed respectively to the adjacent friction faces of the driving and braking members adjacent the same, friction bands secured to the seats of each driven member and adapted for engagement each with its respective friction face, clutch-levers fulcrumed each upon one of said driven members and adapted to effect the alternate engagement of the friction bands of its respective driven member, respectively, with the friction faces of the driving member and the adjacent braking member, and operating means acting independently upon said clutch-levers.

13. In a clutch device, in combination, a driving member having at opposite sides annular friction faces, braking members disposed upon opposite sides thereof and having portions adjacent the driving member formed also with annular friction faces, driven members upon opposite sides of the driving member and each formed with annular seats opposed respectively to the adjacent friction faces of the driving and braking members adjacent the same, friction bands secured to the seats of each driven member and adapted for engagement each with its respective friction face, clutch-levers fulcrumed each upon one of said driven members and adapted to effect the alternate engagement of the friction bands of its respective driven member, respectively, with the friction faces of the driving member and the adjacent braking member, and operating means acting independently upon said clutch-levers and including means co-operating with the latter for insuring the coupling of said driven members with the driving member independently but in the same circular relation and the engagement of the friction faces of the braking members by their respective friction bands also in a fixed circular relation of the driven members with said braking members.

14. In combination, a driving member, a driven member, a clutch element between them, and operating means for said clutch element comprising a reciprocating actuator, a normally stationary controlling arm, a normally retracted latch element for coupling said arm with the actuator, and means connected with said latch element for operatively connecting said arm and its actuator.

15. In combination, a driving member, a driven member, a clutch element between them, and operating means for said clutch element comprising a reciprocating actuator, a normally stationary controlling arm, a normally inoperative latch element for coupling said arm with the actuator, means connected with said latch element for operatively connecting said arm with its actuator, and a detent for maintaining said arm in an extreme position into which it is moved by said actuator.

16. In combination, a plurality of driven members, driving means therefor, a plurality of clutch elements for operatively connecting said driven members with the driving means, and operating means for said clutch elements comprising a reciprocating actuator, independently mounted and normally stationary arms each adapted for control of one of said clutch elements, normally inoperative latch elements for coupling said arms independently with said actuator, and means connected with said latch elements for effecting the successive operative connection of said arms with the actuator.

17. In combination, a plurality of independently movable shafts, driven clutch members mounted respectively upon said shafts, driving means for said clutch members, clutch elements for operatively connecting said driven members with said driving means, and operating means for said clutch elements comprising an actuating cam fixed upon one of said shafts, a rocking sleeve having a lever engaging and deriving operative movements from said cam and formed with a plurality of thrust-receiving arms, independently mounted and normally stationary arms each adapted for control of one of said clutch elements, normally inoperative latch-levers pivotally mounted upon said controlling arms and adapted for engagement with the thrust-sustaining arms of said sleeve, and means for shifting said latch-levers into the paths of movement of said thrust-sustaining arms to effect operative movements of said controlling arms.

In testimony whereof, I have signed my name to this specification.

ALBERT H. DE VOE.